(12) United States Patent
Williams et al.

(10) Patent No.: US 6,363,438 B1
(45) Date of Patent: Mar. 26, 2002

(54) METHOD OF CONTROLLING DMA COMMAND BUFFER FOR HOLDING SEQUENCE OF DMA COMMANDS WITH HEAD AND TAIL POINTERS

(75) Inventors: Emrys John Williams, Sunnyvale, CA (US); Andrew Crosland, Haddenham (GB)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/243,257

(22) Filed: Feb. 3, 1999

(51) Int. Cl.$^7$ .................. G06F 12/00; G06F 13/14; G06F 13/16
(52) U.S. Cl. .............. 710/22; 710/23; 710/24; 710/52; 710/53; 710/56; 709/236; 709/237
(58) Field of Search ............. 710/22, 23, 24, 710/53, 52, 56; 709/236, 237

(56) References Cited

U.S. PATENT DOCUMENTS

| | | | | |
|---|---|---|---|---|
| 5,765,187 A | * | 6/1998 | Shimizu et al. | 711/110 |
| 6,032,204 A | | 2/2000 | Huff et al. | 710/1 |
| 6,092,116 A | * | 7/2000 | Earnest et al. | 709/236 |
| 6,112,267 A | * | 8/2000 | McCormack et al. | 710/52 |
| 6,124,868 A | * | 9/2000 | Asaro et al. | 345/513 |
| 6,161,154 A | * | 12/2000 | Schultz et al. | 710/56 |

* cited by examiner

Primary Examiner—Thomas Lee
Assistant Examiner—Tammara Peyton
(74) Attorney, Agent, or Firm—Conley, Rose & Tayon, PC; B. Noël Kivlin

(57) ABSTRACT

A direct memory access (DMA) controller is provided for a computer system having a processor and a command buffer. The command buffer can be defined, for example, as a ring buffer in the main processor memory and can be directly accessible by the processor, for example over a bus. The DMA controller provides a head register and a tail register operable to hold a head pointer and a tail pointer for addressing the head and tail, respectively, of a sequence of direct memory access commands in the command buffer. The processor is able to store DMA commands in the command buffer. Subsequently, the DMA controller is able to access those DMA commands using the DMA tail pointer held locally in the DMA controller. The DMA controller is operable to compare the head and tail pointers, and to respond to non-equivalence thereof to use the tail pointer value to access direct memory access commands from the command buffer. The DMA controller is responsible for updating the tail pointer in the DMA controller in association with reading of a direct memory access command from a location in the command buffer. The processor is responsible for updating the head pointer in the DMA controller in association with the storing of DMA commands in the command buffer.

35 Claims, 10 Drawing Sheets

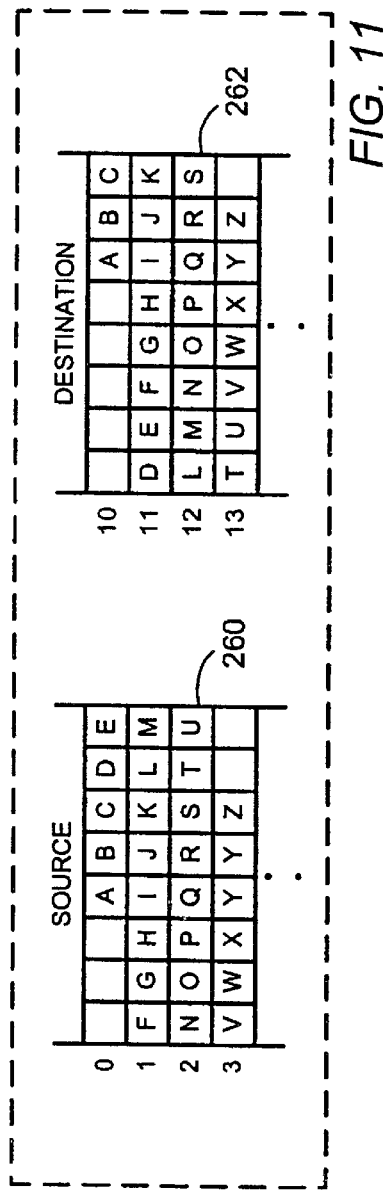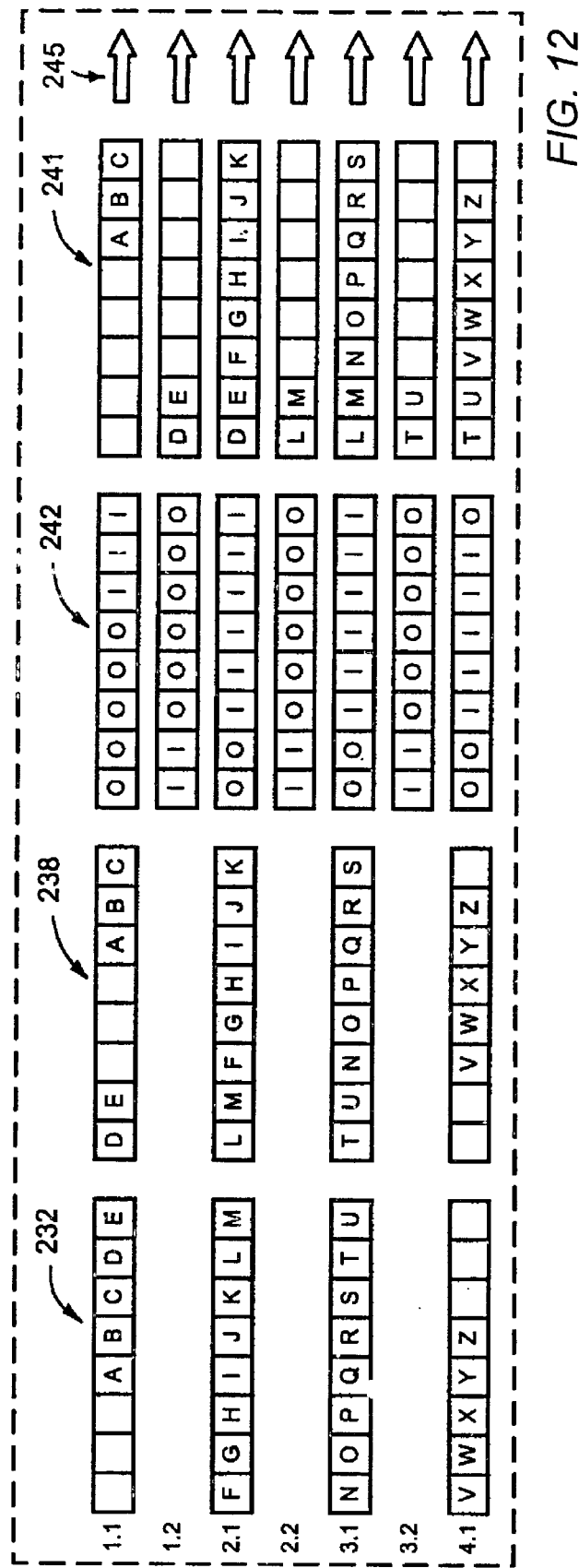

METHOD OF CONTROLLING DMA COMMAND BUFFER FOR HOLDING SEQUENCE OF DMA COMMANDS WITH HEAD AND TAIL POINTERS

BACKGROUND OF THE INVENTION

The invention relates to Direct Memory Access (DMA) control, and in particular, to a DMA controller, to a computer system including a DMA controller and to a method of DMA control.

DMA controllers can be provided in computer systems to enable, for example, devices connected to an I/O bus, or the like, to make direct access to the memory and/or other resources of a processor of the computer system. The DMA controller could be integral with, or separate from, such an I/O device. DMA controllers can also find application in other configurations, for example for facilitating memory to memory transfers. The invention finds application generally to DMA controllers and methods of operation thereof.

By way of non-limiting example, therefore, one typical configuration of a computer system with a DMA controller can include a processor connected to memory via a processor bus. An I/O controller connected to the processor bus can form a bridge between the processor bus and a further bus, for example a bus (SBus) operable under a system bus protocol known as the 'SBus' protocol. A DMA controller can also be connected to the SBus and can provide a further bridge to an I/O bus to which I/O devices are connected. In normal operation, the processor writes to and reads from the memory. However, the direct memory access controller performs DMA operations to provide read and write access to the memory for I/O devices.

The DMA controller needs to receive DMA commands (also known as descriptors) from the processor to enable it to function. The DMA commands can, for example, specify a start address for Direct Virtual Memory Access (DVMA) and I/O bus accesses, and a transfer length up to a given maximum. It has been suggested to hold DMA commands in, for example, a control buffer in main memory, and then to transfer them to the DMA controller under the control of the processor. However, in such a configuration, the transfer of the DMA commands from the processor to the DMA controller can have non-negligible impact on performance of the system. This is due to the I/O traffic needed to provide handshaking over the bus or buses between the processor and the DMA controller in connection with the transfer of the DMA commands. Another problem with use of a command buffer is the addressing of the buffer for the addition to, and removal from, the command buffer of the DMA commands. This is a problem that is common to DMA controllers operable with command buffers.

An aim of the present invention is to provide a DMA controller, a system including such a DMA controller, and a method of operation of such a system, which mitigate the problems described above associated with the transfer of DMA commands to the DMA controller.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided a direct memory access (DMA) controller for a computer system, which computer system includes a processor and a command buffer for holding a sequence of DMA commands. The DMA controller includes control logic and head and tail pointer registers for holding head and tail pointers for pointing to a head and tail, respectively, of a sequence of DMA commands in the command buffer. The control logic is responsive to the tail pointer in the tail register for accessing a DMA command to be transferred from the command buffer to the DMA controller.

By provision of the tail pointer in the DMA controller, the DMA controller is able directly to access DMA commands under its own control and without reference to the processor. The command buffer can be directly addressable by the processor for storing DMA commands in the command buffer. Subsequently, the DMA controller is able to access those DMA commands using the DMA tail pointer, which is held locally in the DMA controller. It is to be understood that the head pointer points to the head of a sequence of DMA commands in the command buffer (i.e. where DMA commands are added to the buffer by the processor) and the tail pointer points to the tail of the sequence of commands in the command buffer (i.e. where DMA commands are taken from the command buffer by the DMA controller). In this manner, the processor is able to buffer the DMA commands and then the DMA controller is able to access those commands at a convenient time, without needing to provide handshaking between the processor and the DMA controller for the transfer of the DMA commands.

Preferably, the command buffer is configured as a ring buffer, that is a buffer addressable by modulo-addressing. This facilitates the addressing of the buffer, as the pointers can be arranged automatically to return to the address at the beginning of the buffer when the end of the buffer address range is reached. In a particularly convenient manner the addressing is on the basis of a base address and offset, with the offset wrapping round, or returning, to a first predetermined value (e.g. 0) when a second predetermined value (e.g., n, where n is the size of the ring buffer) is reached. The use of modulo-addressing facilitates the separation of the control of the pointers between the processor and the DMA controller. In an embodiment, the processor can be responsible for updating the head pointer and the DMA controller can be responsible for updating the tail pointer.

In an embodiment of the invention, the control logic in the DMA controller is operable to compare the head and tail pointers in the head and tail registers, respectively. The control logic can be arranged to respond to the head and tail pointers being equivalent as indicative of the sequence of DMA commands actually containing no DMA commands (i.e., the command buffer is empty). In this case the DMA controller knows that it does not need to carry out a DMA operation to access the DMA commands from the command buffer. Here it is to be understood the reference to the head and tail pointers being "equivalent" refers to these pointers effectively pointing to the same DMA command buffer storage location within the command buffer. This can mean that the numerical values of the pointers are the same, or if different addressing modes are employed, that they have a predetermined relationship to one another.

In this embodiment of the invention, the control logic is operable to respond to non-equivalence of the head and tail pointers as indicative of at least one DMA command being in the sequence of DMA commands. In this case the DMA control logic uses the tail pointer in the tail register for accessing a DMA command to be transferred from the tail of the sequence of DMA commands in the command buffer to the DMA controller. The DMA controller is thereby able locally to determine whether DMA commands are available to be transferred from the command buffer to the DMA controller without needing to access the command buffer.

The DMA controller can further be operable to write a completion indicator to a location in the command buffer from which a direct memory access command has been read. This can be used to indicate which DMA commands have been completed.

The DMA controller can further be operable to update the tail pointer value following completion of a direct memory access command from a location in the command buffer.

In one particular embodiment of the invention the command buffer is provided in main memory and a first bus connects the processor to the memory. The processor is able directly to store DMA commands in the command buffer via the first bus using a mirror head pointer and mirror tail pointer held in a processor register or in memory, and to update the head pointer in the DMA controller. The DMA controller is connected either directly or indirectly to the first bus. Subsequently, the DMA controller is able to access those DMA commands using the DMA tail pointer held locally in the DMA controller. In this manner, the processor is able to buffer the DMA commands and then the DMA controller is able to access those commands at a convenient time, without needing to provide handshaking over the first bus between the processor and the DMA controller for the transfer of the DMA commands. The DMA controller can be connected to a second bus to which one or more DMA devices are also connected.

In another embodiment the DMA controller may be integral with an I/O device.

In a further embodiment, the DMA controller can integral with the processor. In such a case, the DMA command buffer could be held in internal processor storage, for example a special purpose buffer.

In accordance with another aspect of the invention there is provided a computer system including a processor, a command buffer for buffering a sequence of direct memory access (DMA) commands and a DMA controller, as set out above.

As described above, in one particular embodiment the command buffer can be configured in a memory, and a first bus can connect the processor to the memory. The processor can be operable to add DMA commands to the command buffer and to update the head pointer in the head register of the DMA controller. The DMA controller can be connected to a second bus to which one or more I/O devices are connected. Alternatively, the DMA controller can be integrated in an I/O device. In a further embodiment the DMA controller could be integral with the processor.

In a particular embodiment of the invention, a third bus is provided between the first bus and the DMA controller, an I/O control bridge being connected between the first and third buses and the DMA controller being connected between the third and second buses.

The DMA controller can be responsible for updating its own tail pointer in association with the completion of a DMA command from the command buffer. The processor can be responsible for updating the head pointer in the DMA controller in association with the storage of DMA commands in the command buffer. The processor can further be operable to maintain a mirror head pointer in a mirror head register, the processor being responsive to the mirror head pointer for adding DMA commands to the head of the command buffer.

The processor can maintain a mirror tail pointer in a register or memory, and update the mirror tail pointer from the DMA controller tail pointer only when the mirror tail pointer seems to indicate that no command buffer space is left. The likelihood is that by this time, the DMA controller will have advanced its own tail pointer, and the space will actually have become available. This minimizes processor reads of the DMA controller registers.

Although there is a bus overhead involved in updating the head register in the DMA controller, this is much less than the bus overhead associated with a transfer under processor control of the DMA commands from the processor to the DMA controller. This arises from a number of reasons, including the pointer being smaller than the DMA command and because a pointer does not need to be sent for each DMA command. In addition, the DMA controller is able to select when to download the DMA commands. Moreover, the separation of the control of the head and tail pointers facilitates efficient operation of the DMA controller. The addressing of the head and tail pointers is particularly efficient if modulo-addressing of the command buffer is used (e.g., with the command buffer configured as a ring buffer).

As well as, or instead of, being used for I/O transfers, the DMA controller can be used for memory to memory transfers.

In accordance with a further aspect of the invention, there is provided a method of controlling direct memory access (DMA) in a computer system including a processor, a command buffer for holding a sequence of DMA commands and a DMA controller. The method includes steps of:

the processor adding at least one DMA command to a head of the sequence of DMA commands in the command buffer; and the DMA controller transferring a DMA command from a tail of the sequence of DMA commands in the command buffer by DMA using a tail pointer held in a tail register in the DMA controller.

BRIEF DESCRIPTION OF THE DRAWINGS

Exemplary embodiments of the present invention will be described hereinafter, by way of example only, with reference to the accompanying drawings in which like reference signs relate to like elements and in which:

FIG. 11 illustrates source and destination byte alignments for a data transfer;

FIG. 12 illustrates operations of the shifter/rotator and accumulator;

DESCRIPTION OF PARTICULAR EMBODIMENTS

An embodiment of the present invention is described hereinafter with reference to an example configuration of a computer system that is suitable for forming a part of a fault-tolerant computer system. However, it should be noted that the invention is not limited to such an embodiment, and that it may be implemented in any computer system employing a DMA controller.

Figure 1:
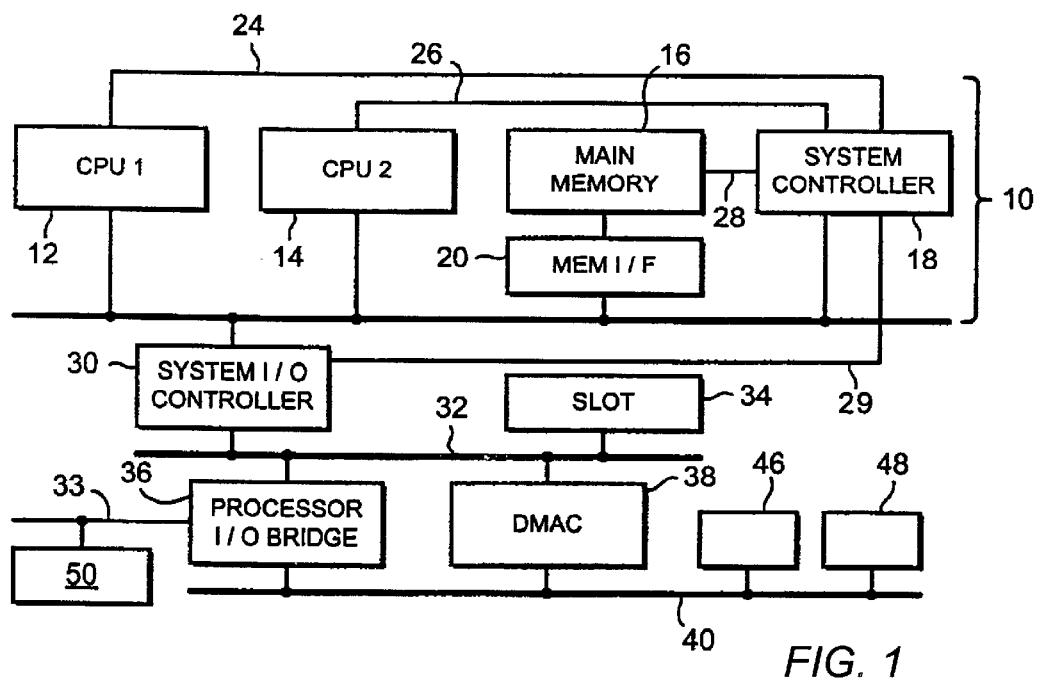
FIG. 1 is a schematic block diagram of an exemplary configuration of a computer system incorporating the present invention.

FIG. 1 is a schematic overview of an example of a computer system 10. The computer system 10 shown in FIG. 1 includes first and second processors 12 and 14, in the present example CPU 1 and CPU 2. In an alternative embodiment, there may, for example, only be a single CPU. The processors 12 and 14 are connected to a first bus 22 operable under a UPA (Universal Processor Architecture) protocol. Also connected to the first bus 22 via a memory interface 20 is a main memory 16. A system I/O controller 30 acts as a bridge between the first bus 22 and a system bus (SBus) 32. A system controller 18 is connected to the first bus 22, and also, via control lines 24, 26, 28 and 29 to the processor 12, the processor 14, the main memory 16, and the system I/O controller 30, respectively.

One or more slots (e.g., slot 34) could be provided for the connection of further components (not shown) to the SBus 32. A processor I/O bus bridge 36 is connected to the SBus 32. This provides a connection to a peripheral bus (PBus) 33 for the connection of one or more peripherals 50. The processor I/O bridge 36 also provides for processor I/O access to one or more peripheral devices 46 and 48 via an I/O bus 40.

A direct memory access controller (DMAC) 38 is also connected between the I/O bus 40 and the SBus 32 to provide DMA access for the peripheral devices on the bus 40 to the processor 10, in particular to the main memory 16 of the processor 10. The DMAC 38 forms a further bus bridge.

For a fault tolerant computer system, the I/O bus could be configured as a pair of fault tolerant redundant buses, with multiple instances of the computer system 10 being connected thereto.

Figure 2:
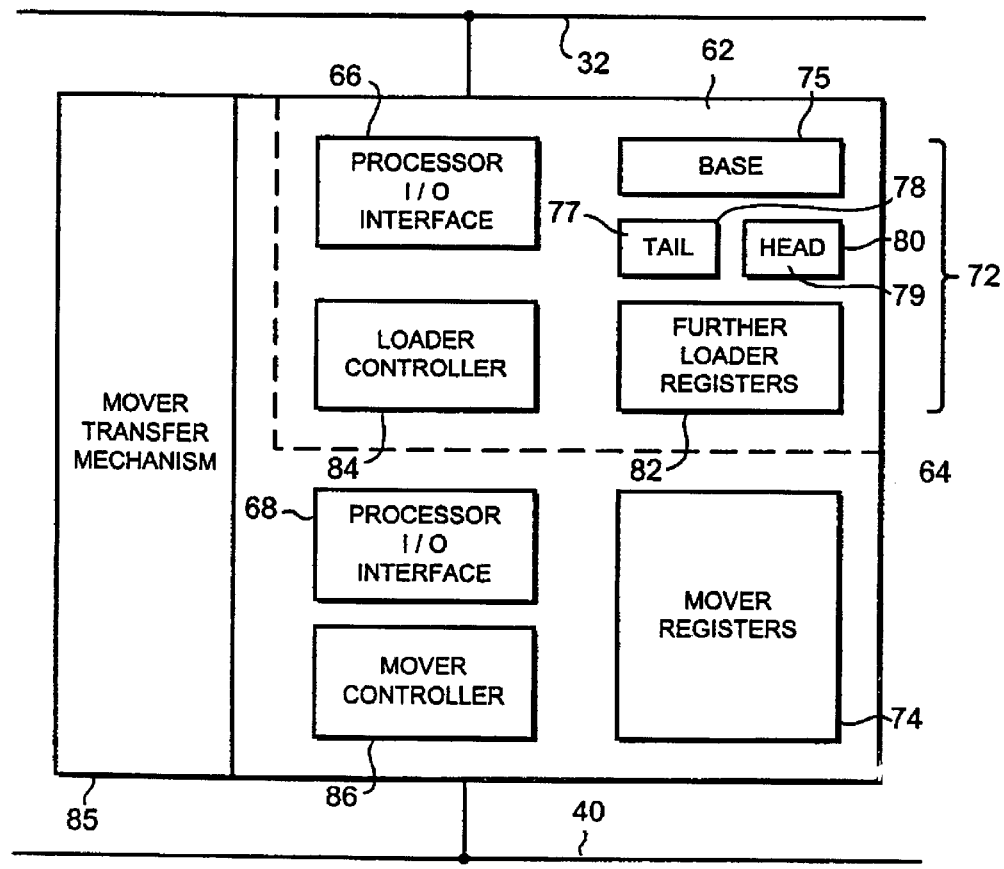
FIG. 2 is a schematic block diagram of a DMA controller of the system of FIG. 1.

FIG. 2 illustrates the DMAC 38 in more detail. The DMAC 38 comprises a loader machine 62 (hereinafter loader 62) and a mover machine 64 (hereinafter mover 64). Each of the loader 62 and the mover 64 has a processor I/O interface (66 and 68, respectively) which enables the processor 10 to control the loader and mover directly.

In an embodiment of the invention, the loader 62 comprises a loader controller 84 which enables the loader 62 to load DMA commands from the main memory 16 into the DMAC 38. In particular, the loader controller 84 is operable to load DMA commands from the main memory 16 of the processor 10 into mover registers 74 in the mover 64.

The loader 62 also comprises registers 72. These include, in particular, a base register 76 for a base pointer 75 to address a command buffer 92 in main memory 16, a tail pointer register 78 for a tail pointer 77 to address the tail of a sequence of DMA commands in the command buffer 92, and a head pointer register 80 for a head pointer 79 to address a head of a sequence of commands in the command buffer 92. Further registers 82 are provided in the loader 62.

The mover 64 is operable to move bulk data between the buses. To this effect, it includes a mover transfer mechanism 85. The mover 64 comprises a mover controller 86, which is operable to control DMA operations according to DMA commands in the mover registers 74. A DMA command for the mover 64 is a 16-byte structure set up by the processor 10. A DMA command causes the mover 64 to move data in either direction between the I/O bus 40 and an SBus DVMA (Direct Virtual Memory Access) address, which translates to main memory. The DMA command is either written directly into the mover registers 74 by the processor 10, or can be written to the command buffer in the main memory 16 and then be loaded into the mover registers 74 by the loader 62.

A DMA command can specify any start address for DVMA and fault tolerant I/O bus accesses. It can specify any transfer length up to a given maximum, with no restrictions on alignment. A DMA command can include:

a DVMA address for main memory;

an I/O bus address;

a count of bytes; and a DVMA action byte.

The DVMA action byte comprises command and status information including direction indicator (for the direction of transfer), a validity bit, an interrupt enable bit and a writeback enable bit.

In order to minimize the overhead for transferring DMA commands between the processor 10 and the DMAC 38, an embodiment of the present invention includes a particular mechanism to achieve the efficient transfer of DMA commands.

Figure 3:
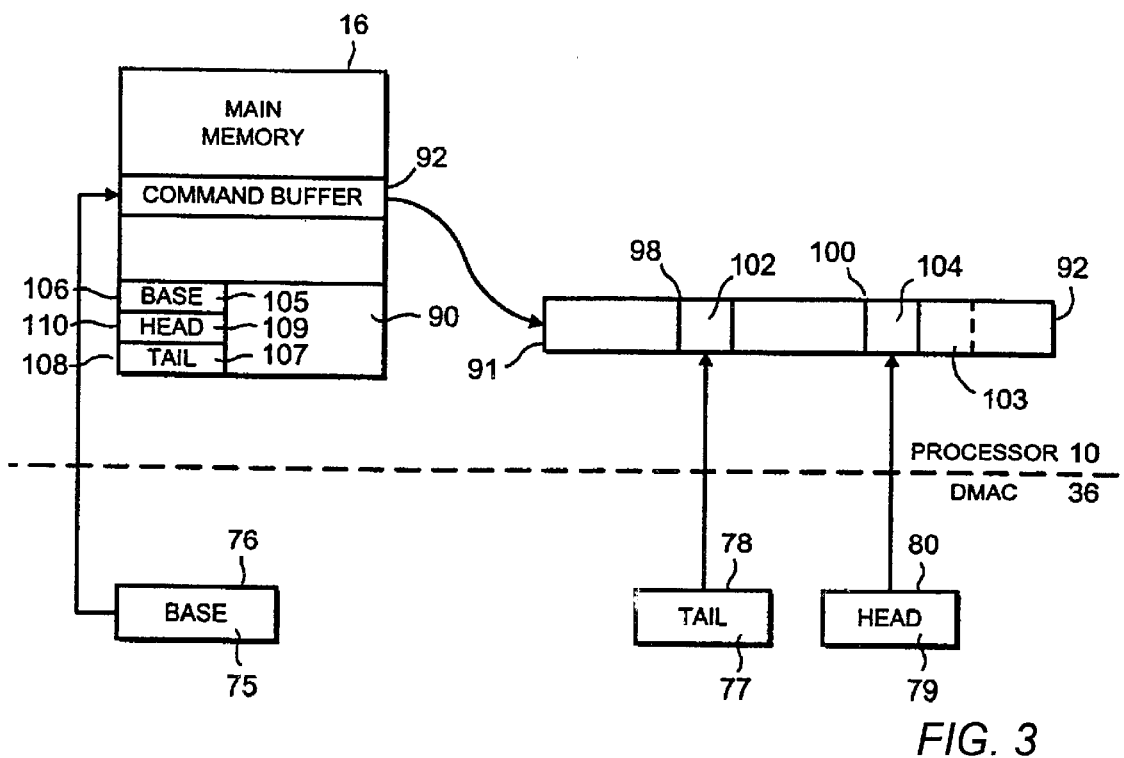
FIG. 3 is a schematic representation of a command buffer in main memory.

As illustrated in FIG. 3, an area of main memory is configured as a command buffer 92. This area of main memory 16 configured as the command buffer 92 is located in the main memory in accordance with constraints of an operating system 90 and the usage of the main memory 16 by the DMA controller. For example, in the present instance, the command buffer is defined as an 8K-byte page arranged on an 8K-byte boundary. FIG. 3 also illustrates the base, tail and head registers 76, 78 and 80 which are held in the DMAC 36. It will be noted that the processor maintains a mirror base pointer 105, a mirror head pointer 109 and a mirror tail pointer 107 in a mirror base register 106, a mirror head register 110 and a mirror tail register 108, respectively.

Figure 4:
FIG. 4 is a representation of a base register.

In an embodiment of the invention, the command buffer base register (base register) 76 in the mover 64 of the DMAC 38 enables addressing of the base 91 of the command buffer 92 in main memory 16. FIG. 4 illustrates the base register 76. This is a 30-bit register with bits 0–12 being 0 (i.e. at the 8K boundary) and bits 13–29 addressing the individual page within the main memory 16.

A tail pointer 77 and a head pointer 79 (held in the tail register 78 and the head register 80, respectively, of the DMAC 38) enable the addressing of the tail 98 and the head 100, respectively, of a sequence of DMA commands held in the command buffer 92. The head of the sequence of DMA commands relates to an end of the sequence at which DMA commands are added to (stored in) the command buffer. The tail of the sequence of DMA commands relates to an end of the sequence at which DMA commands are taken from (read from) the command buffer. As will be described in the following, the command buffer is further configured as a ring buffer (i.e. it is addressed by modulo-addressing).

The base register 76 contains the SBus DVMA address that the DMAC 38 issues in order to find DMA commands in the command buffer 92.

The tail pointer 77 in the tail register 78 provides an index of the DMA command currently being processed (e.g., a DMA command 102). Each increment in the tail pointer 77 in the tail register 78 represents a 16-byte increment in main memory, which corresponds to one DMA command. A tail pointer value of zero represents the command being at the address pointed to by the base register 76.

Figure 5:
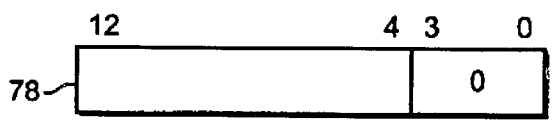
FIG. 5 is a representation of a tail register.

FIG. 5 illustrates an example of the tail register 78. It will be noted that bits 0–3 (i.e., the 16 byte boundary) are zero and bits 4–12 provide the index value within the command buffer 92.

Figure 6:
FIG. 6 is a representation of a head register.

The head register 80 contains the index of the last DMA command (e.g., DMA command 104), which is valid in the command buffer 92 in main memory 16. The addressing provided by the head pointer in the head register 80 is as described for the tail pointer 77 in the tail register 78. As can be seen from FIG. 6, which is an illustration of a head register 80, this has the same format as the tail register 78 illustrated in FIG. 5.

The control of the head and tail pointers 79 and 77 is such as to configure the command buffer 92 as a ring buffer (i.e. modulo-addressing is provided), whereby the pointers wrap round from one end to the other of the command buffer 92. In other words, addresses increase from 0–n (where n corresponds to the maximum index value) and then return to 0. Of course, it will be appreciated that the indexing could equally be in the reverse direction from n to 0 and then back to n.

In a situation where the DMA controller is idle and has completed any ongoing DMA for a current command, if the head pointer 79 and the tail pointer 77 in the head and tail registers 80 and 78, respectively, point to the same location in the command buffer 92, then there are no valid DMA commands in the command buffer and the DMA controller knows that no DMA commands need to be transferred at that time.

The way in which the head and tail registers 80 and 78 are used differs as will be explained in the following. In particular, the head register 80 is managed by the processor 10, whereas the tail register 78 is managed by the DMAC 38.

There now follows a general description of the operation of the system of FIG. 1, and in particular of the operation of the DMAC 38.

As explained above, the DMAC 38 comprises a loader 62 and a mover 64 and is operable in response to DMA commands, which are provided by the processor(s) 12, 14 to the DMAC 38. The DMA command can specify any start address for DVMA and I/O bus accesses, and any transfer length up to a given maximum, with no restriction on alignment. The mover 64 will handle the transfer as best as it can, using the widest transfers and longest bursts it can. For reads that do not end at a convenient address, more data than is specified in the DMA command may be read by the mover 64 at either end of the transfer, to use the fastest possible burst transfers. Excess reads will read no more than up to the next appropriate boundary (e.g., a 64-byte bound-ary on the SBus and an 8-byte boundary on the I/O bus). Writes are handled precisely. Thus, the mover 64 will use whatever combination of small SBus and I/O bus cycles as appropriate to write the expected data in the fastest possible way.

When required the loader 62 can update a DMA command in main memory with a completion status. If specified in the DMA command, the mover 64 will also generate an SBus interrupt. The DMA command is guaranteed to have been completed and the write to memory to have been requested when the interrupt reaches the processor 10, but the timing relationship between the completion status reaching main memory and the interrupt reaching the processor is not defined.

During DMA, processors can queue DMA commands in the command buffer 92 in main memory 16 and can signal their presence to the loader 62 with a single processor I/O write, namely the writing of the new head pointer to the head register 80. By analyzing any difference between the head pointer 79 and the tail pointer 77, when the mover 64 completes DMA for one command, the loader can immediately load the next DMA command into mover registers 74 and start DMA afresh, without waiting for any processor support. In other words, the loader 62 uses a difference between the head pointer 79 and the tail pointer 77 to indicate that DMA commands are waiting to be downloaded from the command buffer 92.

Figure 7A:
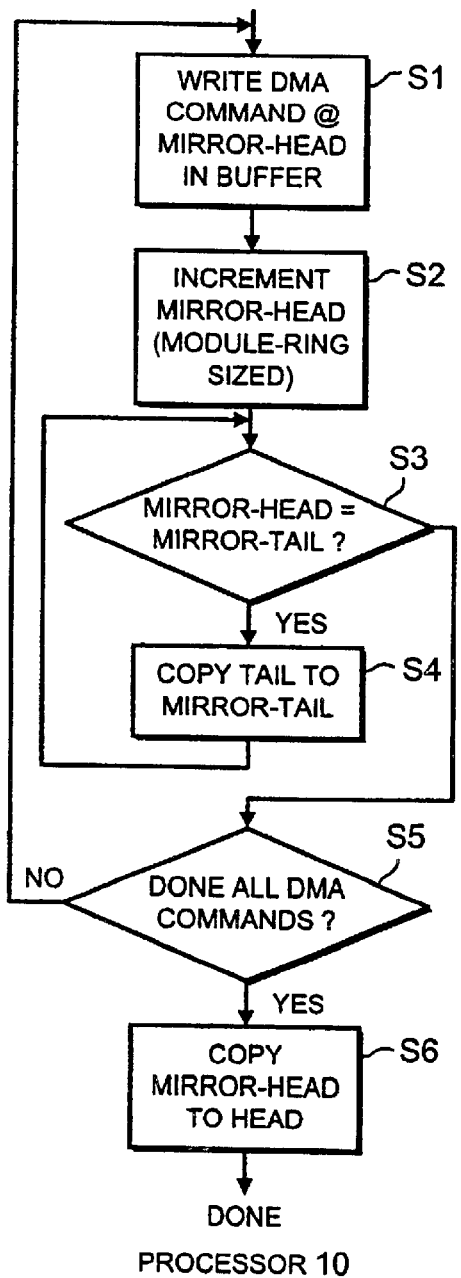
FIGS. 7A and 7B are flow diagrams illustrating the operation of the computer system of FIG. 1 for transferring DMA commands to the DMA controller.
Figure 7B:
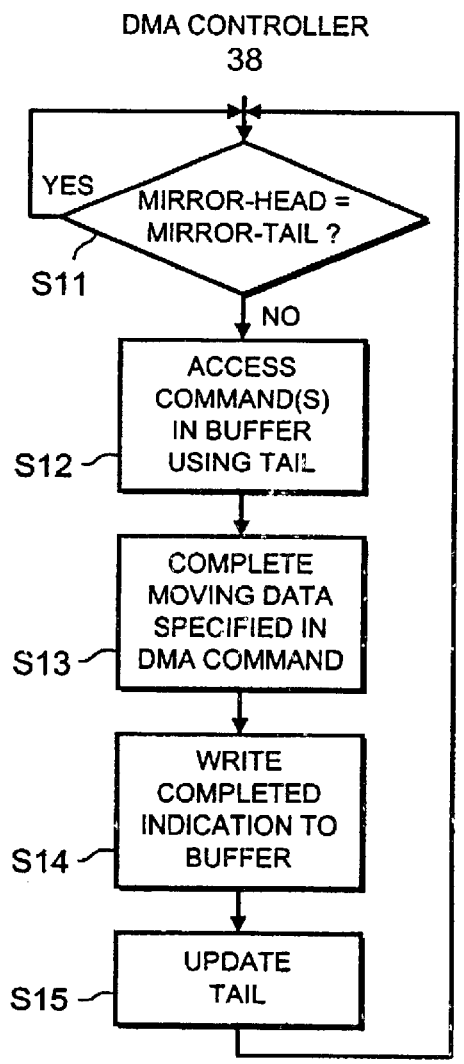

FIGS. 7A and 7B are flow diagrams illustrating the operation of the processor 10 and the DMAC 38.

FIG. 7A represents the steps performed by the processor 10.

In step S1, the processor writes a new DMA command (e.g. DMA command 103) into the command buffer 92. The processor writes a DMA command to the command buffer 92 at an offset identified by the content of the mirror head register 110 (i.e. the mirror head pointer 109). The base of the command buffer is identified by the content of the mirror base register 106 (i.e. the mirror base pointer 105).

In step S2, the processor increments the mirror head pointer 109 in the mirror head register 110. The next location within the command buffer 92 is identified by incrementing the content of the mirror head register 110 by 16 bytes so that it points to the next location beyond the currently last DMA command 104.

In step S3, the processor compares the content of the mirror head register 110 to that of the mirror tail register 108.

If they are equivalent (in the present embodiment, if they are equal), then this means that there may be no more space in the command buffer. In order to check this, it is necessary to make sure that the content of the mirror tail register 108 corresponds to that of the tail register 78. Accordingly, in step S4, the processor copies the current content of the tail register 78 to the mirror tail register 108. If the DMAC 38 has changed the tail pointer 77 in the tail register 78 since the last time the mirror tail register 108 was updated, then the content of the mirror head register 110 and that of the mirror tail register 108 should no longer be equivalent. The loop formed by steps S3 and S4 is repeated until the test in step S3 indicates that the content of the head register 110 and the tail register 108 is not equivalent.

When the test in step S3 indicates that the mirror head pointer 109 is not equivalent to the mirror tail pointer 107, then the processor decides in step S5 whether there are any more DMA commands to be written to the command buffer 92. If there are, then control passes back to step S1. If not, then in step S6, the processor copies the content of the mirror head register 110 to the head register 80 in the DMAC 38 for updating the DMAC's head pointer 79 to correspond to the mirror head pointer 109.

It can thus be seen that the processor 10 may add one or more DMA commands at the head of the buffer 92, and then indicate that all the commands are available to the DMAC 38 with a single write to the DMAC head register 80. This helps to minimize the I/O bandwidth requirements.

The processor 10 does not need to mirror the DMAC tail pointer 77 at every instant in order to determine whether space exists in the command buffer 92. Using steps S1–S6 described above, the processor 10 can use the mirror tail pointer 107, held in the mirror tail register 108, in most cases. The processor 10 determines whether there is space in the command buffer 92 by comparing the contents of the mirror head register 110 and mirror tail register 108. If the mirror pointer values in these mirror registers 110 and 108 are not equivalent (e.g., in the present example they are not equal), then there is space in the command buffer 92 at the address pointed to by the mirror head pointer in the mirror head register 110. The processor updates the mirror head pointer 109 itself when it writes to the head register 80 in the DMAC 38, but does not normally modify the mirror tail pointer 107. When a predetermined relationship between mirror head and tail pointers 109 and 107 is detected (in the present instance when there is equality between the mirror head and tail pointer values), the processor 10 checks whether the DMAC 38 has updated the tail pointer 77 since it last checked this. The processor 10 can execute a single read access to the tail register 78 in the DMAC 38 to find the current value of the tail pointer 77 and to copy, or write this to the mirror tail register 108. If the DMAC 38 is handling requests at approximately the rate at which the processor 10 generates DMA requests, the processor 10 will only need to access the DMA tail register 78 once every complete rotation of the ring buffer 92. This further minimizes I/O bandwidth requirements.

FIG. 7B represents the steps performed by the DMAC 38.

In step S1, the loader 62 is operable to compare the head and tail pointers 79 and 77. If the head and tail pointers 79 and 77 are equivalent, then it is determined that there are currently no DMA commands awaiting transfer from the main memory to the mover 64. Accordingly, the DMAC loader 62 waits until there is a difference between the head and tail pointers 79 and 77. Here it is to be understood that equivalence means that the pointers are effectively pointing to a common DMA command storage location in the command buffer. In the present embodiment, this means that they have the same value. However, in another embodiment they could have values with a predetermined relationship to one another, depending upon the addressing mode(s) used.

If the head and tail pointers 79 and 77 are not equivalent (i.e., in the present embodiment if they have different values), then, in step S12, the loader 62 uses the tail pointer 77 to access the last command in the command buffer 92 by a DMA read operation. Accordingly, the DMAC loader 62 is able to transfer the next DMA command (e.g. DMA command 102) from the main memory 16 to the mover registers 74.

Following step S13, in which the mover completes moving data specified in the DMA command, in step S14 the loader is operable to write a "done" or "completion" indication to the command buffer location from which the DMA command has just been read. The processor can use this to monitor which DMA data have been transferred successfully by the DMAC 38.

In step S15, the DMAC loader 62 updates the tail pointer 77 to point to the new tail within the command buffer 92.

Steps S11 to S15 above define functions provided by the loader controller 84 of FIG. 1.

As mentioned above, the head and tail pointers 79 and 77 can be operable to configure the command buffer 92 as a ring buffer by means of modulo-addressing. In this manner, the string of commands awaiting transfer from the main memory to the DMAC 38 can wrap around within the memory space allocated for the command buffer. Effectively, therefore, the modification of the head and tail pointers 79 and 77 is effected in a "modulo"-manner based on the memory space allocated for the command buffer 92.

As described above, the processor 10 can be operable to write a sequence of one or more DMA commands to the command buffer 92. The sequence of commands can be written, with only the last address of the DMA commands transferred being sent to the head register 80 in the DMAC 38. The tail pointer 77 is updated for each DMA command since it is used to form the address for the next command. The DMAC loader 62 can be operable to transfer a series of DMA commands from the command buffer 92 to the DMAC mover 64. In this case, an interrupt can be generated, or the last command completion status in the main memory can be updated, after the sequence of DMA commands has been transferred from the command buffer 92 to the DMAC mover 64 and the last DMA command has been completed.

There follows a brief description of the further registers provided in the DMAC loader 62 and the DMAC mover 64.

The further registers 82 in the DMAC loader 62 can include loader status registers indicating a current loader status. A loader moves between two major states, namely passive and active. A power-on reset, a synchronized reset, any data transfer error, or a direct processor command can move the loader to a passive state. Only a direct processor command can move the loader to the active state.

In the active state, the loader may or may not be processing DMA commands. When all commands have been completed, the content of the head register 80 (i.e. the head pointer 79) will be equivalent to that of the tail register 78 (i.e. the tail pointer 77). The loader will wait indefinitely in the active state for the processor 10 to write a new value to the head register 80, after which the loader will process new DMA commands. The active state is the normal state for the loader.

The mover registers 74 in the DMAC mover 64 comprise a number of different registers.

A DMAC_ACTION register defines the current mover operations. This register is loaded automatically by the DMAC loader 62 and depends on an action byte of a DMAC command in main memory. The DMAC_ACTION registers include command and status information. This can include a direction indicator, a validity indicator, an interrupt enable indicator and a writeback enable indicator. The direction indicator indicates the direction of transfer. The validity indicator enables checking of the validity of the command. The interrupt enable indicator indicates whether the DMA mover generates an interrupt on completion of a DMA operation. The writeback enable indicator indicates whether a completion status is to be written back to the command buffer after completing a command. When the DMAC mover has completed an action command, it updates DMAC_ACTION with a termination status. If write-back is enabled, in the DMAC_ACTION register, the DMA loader writes the updated DMAC_ACTION back into main memory 16. The DMAC_ACTION register may contain further status bits for further status indicators.

A DMAC_DVMA register defines an SBus DVMA address to be used for DMA. This DVMA address is translated into a real address by an I/O memory management unit in the system I/O controller 30. This register is loaded automatically by the DMAC loader 62 from a DMA command in the command buffer 92.

A DMAC_IOAD register defines a I/O bus DVMA address for use for DMA. This register is also loaded automatically by the loader from a DMA command in the command buffer 92.

A DMAC_COUNT register provides a DMAC transfer byte count. This provides the number of bytes to transfer for a DMA command. This register is also loaded automatically by the DMAC loader 62 from a DMA command in the command buffer 92.

As mentioned above, the processor 10 maintains mirror base, tail and head pointers 105, 107 and 109 in mirror base, tail and head registers 106, 108 and 110, respectively. As shown in FIG. 3, these registers can be held in main memory. Alternatively, they could be formed by CPU registers.

Figure 8:
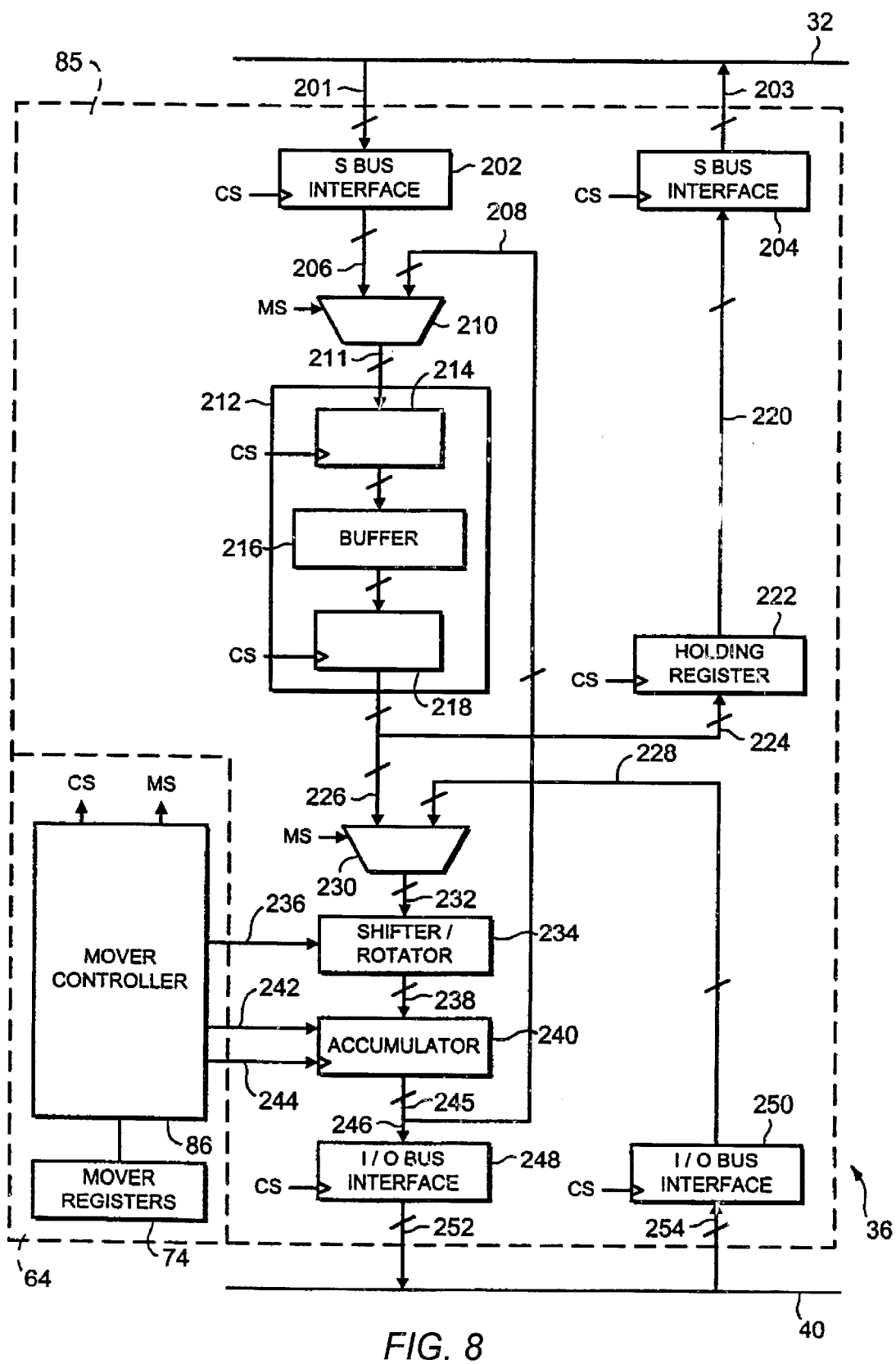
FIG. 8 is a schematic block diagram of a DMA transfer mechanism of the DMA controller of FIG. 2.

FIG. 8 illustrates further aspects of the DMAC 36 in more detail. In particular, FIG. 8 illustrates more details of the DMA transfer mechanism 85.

As illustrated in FIG. 8, a first SBus interface 202 is connected to receive data from the SBus 32. A second SBus interface 204 is connected to transfer data to the SBus 32. The SBus interfaces are clocked by clock signals CS supplied by the mover controller 86. As illustrated in FIG. 3, the SBus is a single bus 32. However, it will be appreciated that the SBus may comprise control, address and data lines, and the SBus interfaces 202 and 204 can be configured as multiple clocked buffers, each buffer being responsible for one or more of the control, address and data lines. The output of the SBus interface 202 is supplied via a line 206 to form a first input to a multiplexor 210. A second input to the multiplexor 210 is formed by a path 208 connected to the output of an accumulator 240.

Selection of the first and second inputs to the multiplexor 210 is effected by multiplex signals MS output by the mover controller 86. The output 211 of the multiplexor 210 is supplied to a buffer stage 212. The buffer stage 212 includes clocked input gates 214, a buffer storage (e.g. a random access memory with a capacity of 128 by 8 bytes) and clocked output gates 218. The clocked input and output gates 214 and 218 receive clock signals CS from the mover controller 86.

The output of the buffer stage 212 is supplied to form a first input 226 to a second multiplexor 230, and also an input 224 to a holding register 222. The holding register 222 is also clocked by clock signals CS from the mover controller 86. The output of the holding register 222 forms an input 220 to the second SBus interface 204.

A second input 228 to the second multiplexor 230 is formed by the output from a first I/O Bus interface 250.

Selection of the first and second outputs from the second multiplexor 230 is also effected by multiplex signals (MS) from the mover controller 86. The output 232 of the second multiplexor 230 is supplied to a shifter/rotator 234. The shifter/rotator 234 is a controllable barrel shifter for providing a selectable barrel shift. The shifter/rotator 234 receives shift control signals 236 from the mover controller 86. The output 238 from the shifter/rotator 234 is supplied to an accumulator 240. The accumulator 240 receives byte enable signals 242 from the mover controller 86 and also phase signals 244 from the mover controller 86. The output from the accumulator 240 forms the second input 208 to the first multiplexor 210, and also forms an input 246 to a second I/O bus interface 248. The first I/O bus interface 250 and the second I/O bus interface 248 are also clocked by clock signals CS from the mover controller 86. An output 252 from the I/O bus interface 248 is provided for putting data onto the I/O bus 40. An input 254 to the first I/O bus interface 250 is provided for receiving data from the I/O bus 40.

A description of the operation of the mover transfer mechanism 85 will be described in the following. It will be noted that the mover controller 86 is operable in response to data in the mover register 74 of the mover 64 to control operation of the mover transfer mechanism 85.

Figure 9:
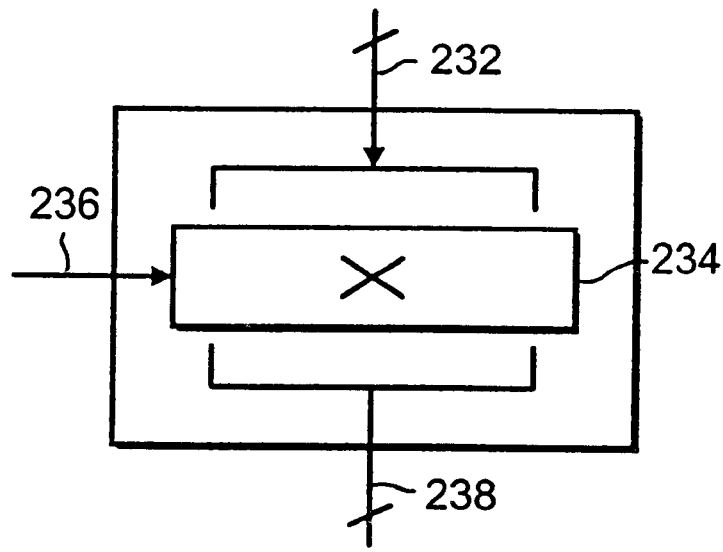
FIG. 9 is a schematic block representation of a shifter/rotator of the mechanism of FIG. 8.

FIG. 9 is a schematic representation of the shifter/rotator 234. As illustrated in FIG. 4, the input 232 to the shifter/rotator 234 and the output 238 from the shifter/rotator 234 are multi-byte outputs. The shift inputs 236 from the mover controller 86 are operable to control a barrel shift operation within the shifter/rotator 234 selected by the shift control signals 236.

Figure 10:
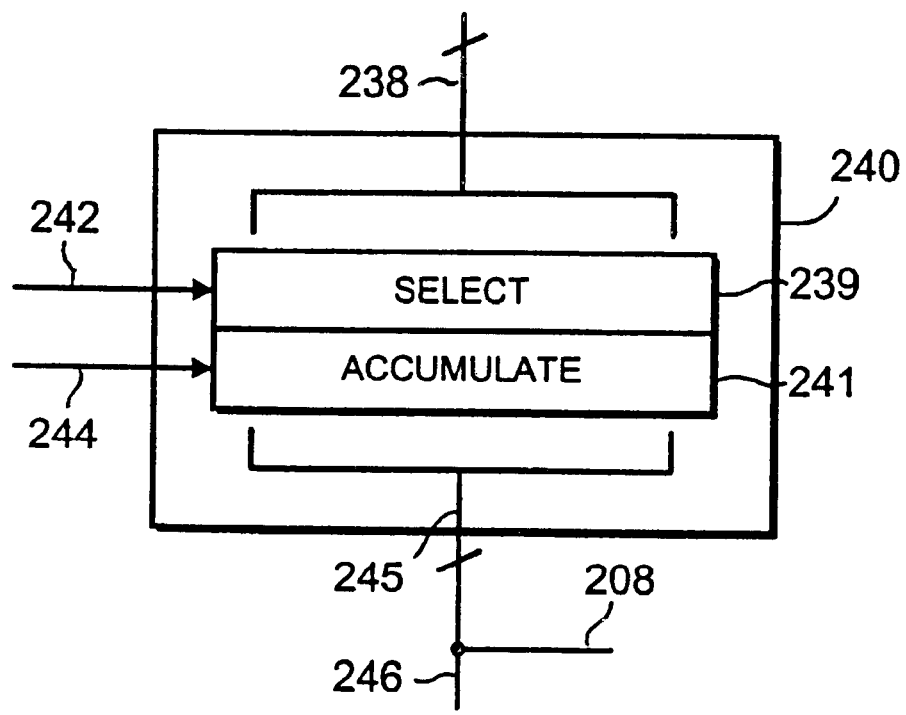
FIG. 10 is a schematic representation of an accumulator of the mechanism of FIG. 8.

FIG. 10 illustrates the accumulator 240. The inputs 238 from the shifter/rotator 234 to the accumulator 240 are supplied in parallel to a byte mask 239. The byte mask is operable to select one or more bytes from its input in accordance with byte enable signals 242. An accumulator register 241 is operable selectively to accumulate and output the bytes supplied by the byte mask 239 in accordance with phase signals 244. It should be noted that although in the present instance the masking is on a byte-by-byte basis, in other embodiment, the selection could be on another basis, for example on a bit-by-bit basis. The phase signals control different phases of operation of the accumulator register 241 to accumulate and then output the accumulated bits. The byte enable signals 242 and the phase signals 244 are supplied by the mover controller 86. The outputs from the accumulator register 241 are supplied to the lines 208 and 246.

In FIG. 8, all of the internal data path lines are 64 bits wide (i.e., 8 bytes wide), as marked by a diagonal slash. It should be noted, however, that the data and address lines on the buses 32 and 40 may be controlled separately, by means of separate bus interfaces, in which case the lines connecting the buses to the interfaces may be other than the internal data width. It will also be appreciated that the internal data width in the present example is merely one example of a possible internal data width, and other internal data widths (for example, 32 bits or 128 bits) may be used instead.

FIG. 11 is an illustration of a possible transfer between a source bus (which can be either the SBus 32 or the I/O bus 40) and a destination on the other of those buses. In the present instance, an 8 byte-wide data source is shown as the embodiment provides 64 bit-wide data paths. As suggested above however, in other embodiments other data widths may be employed. Of course the DMA transfer could be between other buses depending on the location of the DMAC 38.

It will be noted that the source information 260 starts at byte 4 of word 0. The destination information, however, starts at byte 6 of word 10. Accordingly, it can be seen that it is not possible merely to transfer the bytes word-by-word from the source to the destination. The mover transfer mechanism is arranged to provide very efficient transfer of data from the source to the destination addresses.

There follows a description of the operation of the shifter/rotator 234 and the accumulator 240, with reference to FIG. 12.

In FIG. 12, the first column represents the inputs 232 to the shifter/rotator 234 for first, second, third and fourth stages in the transfer. The second column indicates the output 238 of the shifter/rotator 234 in those four stages. The third column represents the byte enable signals 242 supplied to the accumulator 240 in first and second phases for the stages 1–4. The fourth column illustrates the content of the accumulator register 241 in each of the phases of the four stages. The arrows in the fifth column represent the output at 245 of the content of the accumulator 240 during the first phase of each of the four stages 1–4. The references in the first column 1.1, 1.2, 2.1 etc., represent the first phase of the first stage, the second phase of the first stage, the first phase of the second stage, etc. A more detailed explanation of FIG. 12 will now follow.

Accordingly, in the first stage (as shown at 1.1) the input to the shifter rotator 234 is the content of the source word 0 (i.e. *ABCDE). The shifter/rotator 234 barrel shifts this information to the right by 2 byte positions to give the signals indicated in column 1.1 at 238 (i.e. DE*ABC). This information is immediately available at the output of the shifter/rotator 234. At the same time, in this first phase, the byte enable signals illustrated in row 1.1 at 242 (00000111) are supplied to the byte selector 239 of the accumulator 240. This accordingly causes the accumulator 240 to accumulate in the accumulator register 241 the bytes available at the positions identified by a "1" in the byte enable signals, and not to select the content of the byte positions corresponding to a "0" in the byte enable signals. The content of the accumulator register 241 is immediately output (as illustrated in row 1.1 at 245) to form the first destination byte 10 (i.e. *****ABC).

Three bytes are shown as being output in one go. In other embodiments, where this is not desired, or possible, the mover controller 86 could supply signals to cause the three bytes to selected one at a time for output.

In a second phase of operation as illustrated in row 1.2, the inputs and outputs to and from the shifter/rotator 234 remain the same. However, the byte enable signals 242 supplied to the accumulator change to 11000000. As a result, this causes the first two bytes (D and E) input to the accumulator 240 to be selected by the selector 239 and to be accumulated in the accumulator register 241. However, these signals are not output, but are instead held in the accumulator register until the next phase of operation.

The next phase of operation forms the first phase of step 2. As shown at row 2.1, the input 232 to the shifter/rotator 234 changes to the information for word 1 from the source bus (i.e., FGHIJKLM). The output 238 from the shifter/rotator 234 corresponds to the input barrel shifted to the right by two bytes (i.e., LMFGHIJK). In this phase, the byte enable signals are changed to 00111111 as shown at 242 in FIG. 7, whereby the selector 239 selects the signals FGHIJK for accumulation in the accumulator unit 241. This then completes the second word to be supplied to the destination, and this is then output as a word of 8 bytes as indicated by the arrow at 245 in column 2.1.

It will be appreciated from study of FIG. 12 how this process continues for phases 2.2, 3.1, 3.2 and 4.1. It will be noted that there is no need for a phase 4.2 as the information to be output for the fourth destination byte (byte 13) is already contained in the accumulator at the end of phase 4.1. Accordingly, in this example, this information is immediately output as shown by the arrow at 245 in column 4.1. In other examples, as less than a word of eight bytes is to be output, this could be output in groups of one, two and/or four bytes according to a particular implementation.

It can, accordingly, be seen how information can very effectively be barrel shifted and accumulated to transfer from a source alignment to a destination alignment for transfer between the buses 32 and 40, or between the buses 40 and 42.

The detailed movements of bytes can vary from implementation to implementation. For example, when both buses are operating in burst mode, the accumulator 240 can be caused to operate in two phases as described above. The first phase captures n bytes of an I/O data word x from the shifter. The second phase captures (8-n) bytes from an I/O data word (x+1). The content of the accumulator is then transferred to the buffer 216 and immediately captures n bytes from (x+1) and so on. The value of n is related to the shift and depends on the byte offsets of the start address on the source and destination buses.

It is noted that the shift signals 236, the byte enable signals 242 and the phase signals 244 are all provided by the mover controller 86. The mover controller 86 is operable to respond to data stored in the mover registers 74, including the source and destination addresses, and the direction of transfer, to generate these signals, and also the clock CS and multiplex signals MS supplied to the other units illustrated in FIG. 8.

Figure 13:
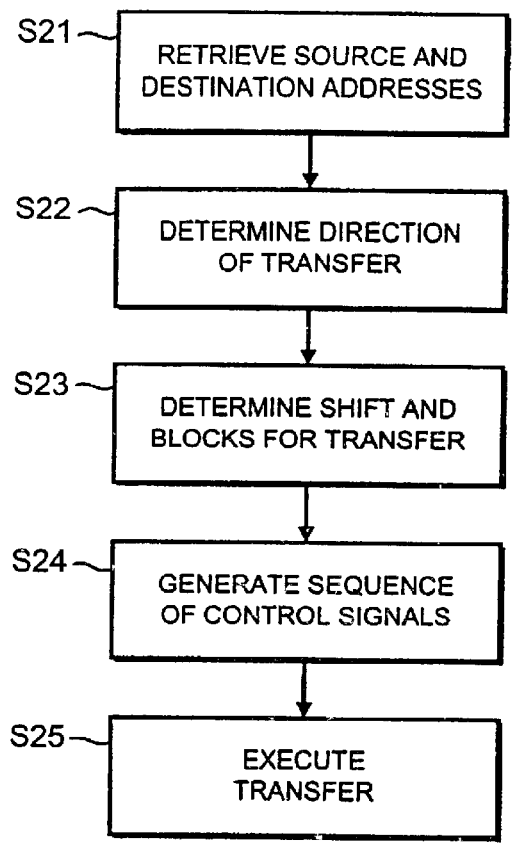
FIG. 13 is a flow diagram illustrating control operations for data transfer.

FIG. 13 is a block diagram summarizing the operation of the mover controller. Accordingly, in step S21 the mover controller retrieves source and destination addresses from the mover register 74. In S22, it determines the direction of transfer between the buses 32 and 40. This information is typically determined by a transfer direction indication in one of the mover registers 74. However, it could alternatively be derived directly from the source and destination addresses where possible using the bus protocols concerned.

In S23, the mover controller determines the shifting to be performed within the shifter/rotator, and a sequence of block sizes for transfer.

It should be noted that this information can readily be calculated in accordance with well establish algorithms, given the exact source and destination addresses and the direction of transfer. The determination of the blocks for transfer is established to effect as efficient as possible a transfer between the buses.

Figure 14:
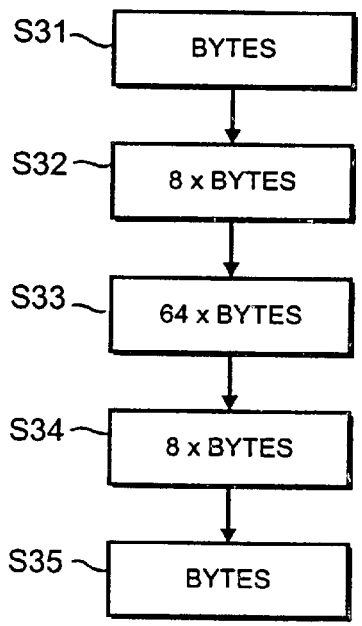
FIG. 14 illustrates possible block transfer operations.

As illustrated in FIG. 14, the transfer can be effected for different block sizes depending on the availability for block transfers of those sizes to be effected within the available bus protocols and the available hardware design width. This can be freely chosen.

As illustrated in FIG. 14, it is envisaged that the transfer blocks may have a single byte size, an 8-byte size and a 64-byte size. In other embodiments, bit transfers would also be possible for amounts less than one byte. As represented schematically in FIG. 14, a theoretical transfer could include:

In step S31 initial transfers with byte size blocks is effected until an "8-byte" block boundary is reached.

In step S32, bytes could be transferred on an 8-byte block size until a "64-byte" block boundary is reached.

In step S33, transfers could be effected on 64-byte blocks until, approaching the end of the transfer, it is necessary to return to 8-byte block sizes.

In Step S34, 8-byte blocks are transferred until it is necessary to transfer the remaining bytes as byte sized blocks.

In step S35, the remaining bytes are transferred.

As indicated above, a first step prior to step S31 and/or a final step after step S35 could provide transfers on a bit basis.

It can be seen from the above that the determination of a combination of one or more of the stages above can readily be effected by the mover controller 86, given the size of the transfer to be effected and the exact source and destination addresses, as distributed with respect to 8-byte and 64-byte block boundaries. Clearly, if a suitable alignment is already effected, one or more of the steps illustrated in FIG. 9 can be omitted.

Returning to FIG. 13, once the determinations of Step S23 have been made, the detailed sequence of control signals can be generated in step S24 in order, in step S25, to execute the transfer.

As mentioned above, it is necessary to determine the direction of transfer between the buses 32 and 40. Thus, the transfer may be from the SBus 32 to the I/O bus 40, or vice versa.

Figure 15:
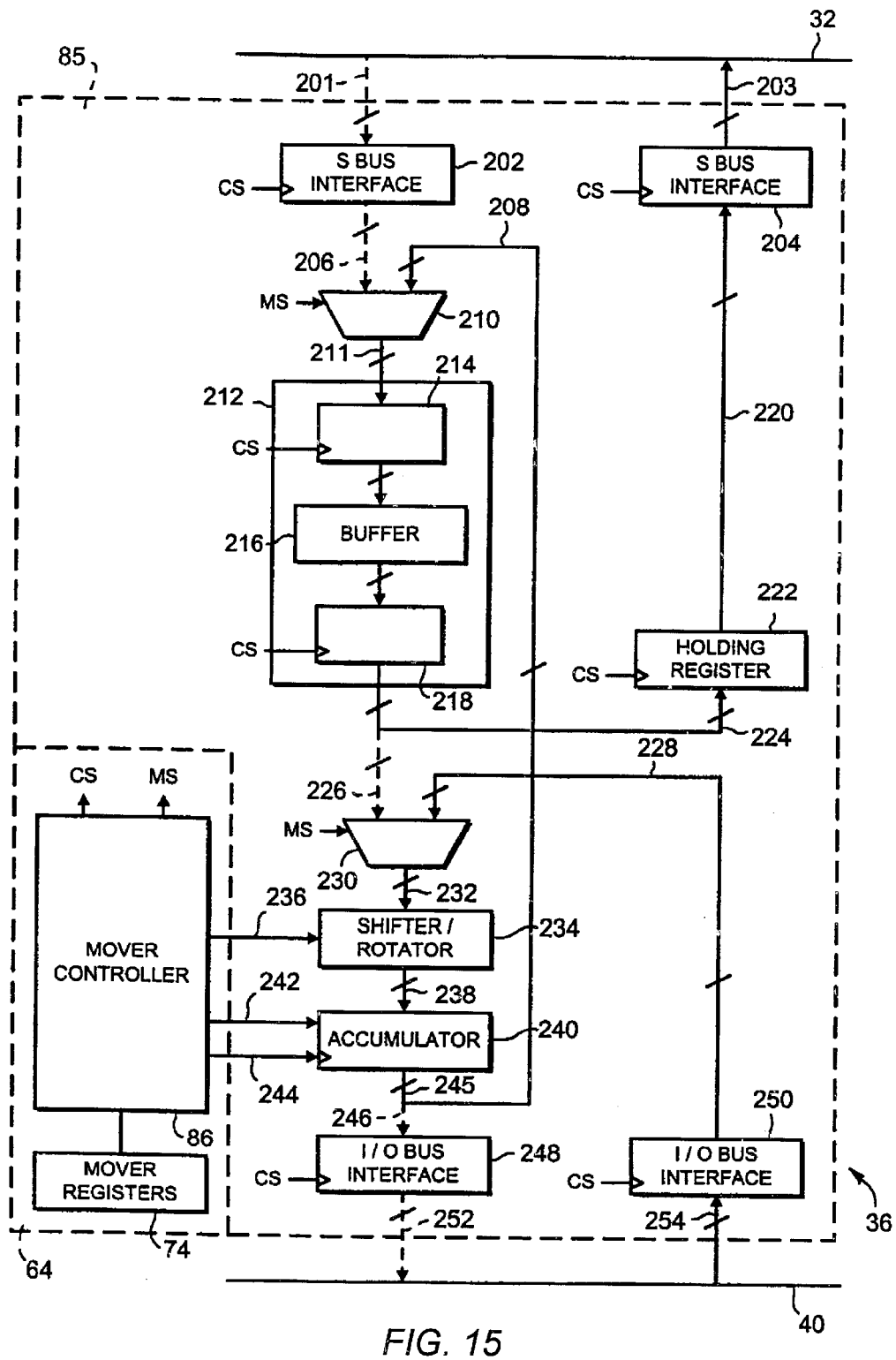
FIG. 15 illustrates the configuration of the mechanism of FIG. 8 for transfers between a first bus and a second bus.

Control of the direction of transfer is effected by providing the multiplex signals MS to the first multiplexor 210 and the second multiplexor 230. FIG. 15 illustrates the transfer of data from the I/O bus 40 to the SBus 32. In order to effect this, the first multiplexor 210 is controlled to select its second input, that is the output of the accumulator 240. The second multiplexor 230 is controlled to select its second input 228 from the I/O bus interface 250.

Accordingly, bytes to be transferred received at the I/O bus interface 250 from the I/O bus 40 are supplied to the second multiplexor 230, which in turn supplies those bytes to the shifter/rotator 234. The shift/rotation and accumulation process already described above with respect to FIGS. 6 and 7 is effected in the shifter/rotator and accumulator and the bytes output from the accumulator are supplied to the first multiplexor 210. The output from the first multiplexor 210 is buffered in the buffer 216 to form blocks of data for transfer to the holding register 222 for transfer via the SBus interface 240 to the SBus 32. The buffer 212 and the holding register 222 enable buffering of data between the I/O bus and the SBus 32 to take account of different bus speeds and bus access availability.

It will be noted that the lines 210, 206, 226, 246 and 252 are shown dashed in FIG. 15. This is used to represent that data is not being transferred along those paths in a situation where data is transferred from the I/O bus 40 to the SBus 32.

Figure 16:
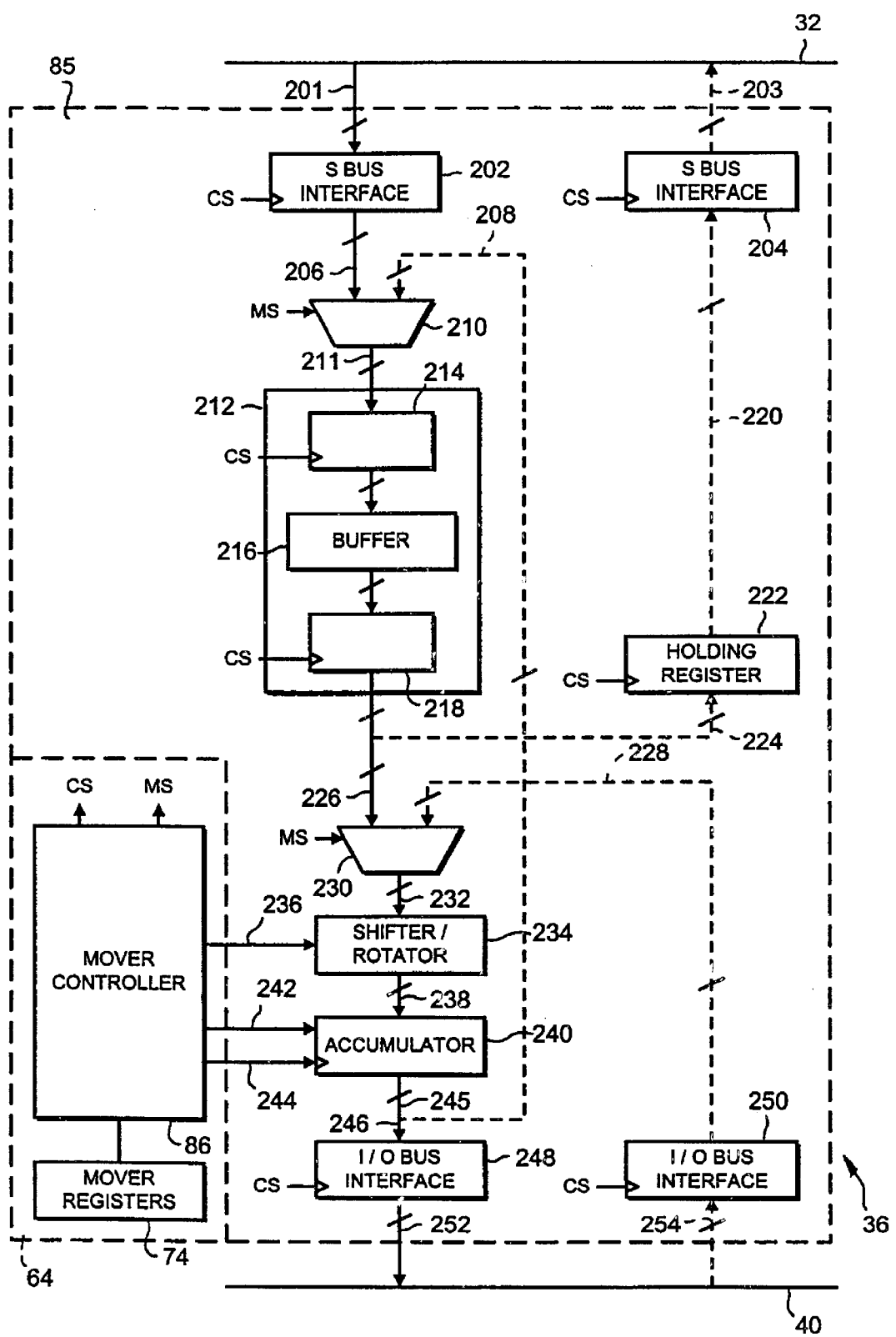
FIG. 16 illustrates the configuration of the mechanism of FIG. 3 for transfers between the second bus and the first bus.

FIG. 16 illustrates the alternative situation that data transfer is being effected between the SBus 32 and I/O bus 40. In this case, it will be noted that the lines 201, 206, 226, 246 and 252 are shown as solid lines, whereas the lines 254, 228, 208, 224, 220 and 203 are shown dashed. This is to indicate that data does not flow along the dashed lines during the transfer of information from the SBus 32 to the I/O bus 40.

Accordingly, in the situation illustrated in FIG. 16, data is received from the SBus 32 over the lines 201 to the SBus interface 202. The data from the SBus interface 202 is supplied via lines 206 to the first multiplexor 210. In this case, multiplex signals MS are supplied to the first multiplexor 210 to select its first input. Accordingly, the data received at the input 206 of the multiplexor 210 is supplied to its output 211 for buffering in the buffer unit 212. The data is output from the buffer unit 212 in order to provide a constant flow through the shifter/rotator and accumulator 240 for transfer to the I/O bus 40. Thus, data output from the buffer unit 212 is supplied to the first input 226 of the second multiplexor 230. Multiplex signals MS are supplied to the second multiplexor 230 to select its first input 226. Accordingly, the data of the first input 226 of the multiplexor 230 are supplied to its outputs 232. The shift/rotation and accumulation operations described above with respect to FIGS. 6 and 7 are effected by the shifter/rotator 234 and the accumulator 240. The data output therefrom is supplied via lines 245 and 246 to the I/O bus interface 248 for output via lines 252 to the I/O bus 40.

Accordingly, there has been described a shift-accumulate mechanism 234–240 which is used in accordance with a FIFO buffer 216 to take data from a source bus and to realign it to a desired alignment for output to a destination bus. In this particular example, the two buses are an SBus 32 and an I/O bus 40. The source could be either one of those buses and destination the other of those buses. However, it will be appreciated that the present invention is generally applicable to buses operable under any suitable bus protocol.

In the present instance, the natural byte alignment used on an SBus is 64 bytes and the mechanism enables the use of 64 byte burst transfers wherever possible. The I/O bus in the present example is 8 byte aligned. In the present example the I/O bus transfers may be up to 512 bytes in length, starting and ending on an 8-byte boundary. However, in other examples different sizes of buses and bus transfers may be effected. In a first mode (DMA read mode), the I/O bus is the source and the SBus is the destination. The shifter/rotator 234 is an 8 byte barrel shifter which rotates the data depending on the relative byte alignments of the starting source and destination addresses. I/O bus transfers can be used to read from the source address. It will be noted with reference to FIG. 12 that some extra data may be read at the beginning and end of the transfer. Bytes are captured in the accumulator until the destination address is 8 byte aligned. The accumulator contents can then be transferred to the buffer 216. The buffer content can then be written to the SBus using byte, or 8 byte transfers until a 64-byte address boundary is reached, at which point 64 byte burst transfers are used.

When both buses are in burst mode, the accumulator operates in two phases. The first phase captures n bytes of an I/O data word x from the shifter. The second phase captures (8-n) bytes from an I/O data word (x+1). The content of the accumulator is then transferred to the FIFO buffer and immediately captures n bytes from (x+1) and so on. The value of n is related to the shift and depends on the byte offsets of the start address on the source and destination buses.

Operation in DMA write mode is similar except that the SBus is then the source and the I/O bus is the destination. SBus reads always begin on 64 byte bursts. Some extra bytes may be read at the beginning and end of the transfer. Data is read into the FIFO buffer 216 and proceeds through the shifter/rotator 234 and accumulator 240 to be written to the I/O bus. Individual bytes (or groups of bytes) are written to the I/O bus until an 8 byte address boundary is reached, at which point 8 byte burst transfers are used until less than 8 bytes remain. Remaining bytes are then transferred singly.

It can be seen that a very effective and flexible method has been described for transferring bytes between two buses. Although this has been described with reference to transfers on byte, 8 byte and 64 byte boundaries, it will be appreciated that the transfers could be effected on other boundaries, and could be effected on a sub-unit of a byte, for example, a bit basis.

More particularly, there has, therefore, been described a DMA architecture which enables the efficient transfer of DMA commands from a processor 10 to a DMAC 38. In the described embodiment, the processor 10 merely needs to transfer a head pointer, (i.e., 12 bits in the present example) following the writing of DMA commands to a command buffer 56 held in local processor memory, rather than needing to transfer a 16 byte DMA command, or series of 16 byte DMA commands. The DMAC 38 is then able to transfer the DMA commands using DMA operations at a time convenient to the DMAC. Accordingly, an embodiment of the invention does not tie up the use of the bus with handshaking regarding the transfer of the individual DMA commands. Also, the DMAC is able automatically to identify that DMA commands are waiting for transfer by simply comparing head and tail pointers held within the DMAC.

Although a particular exemplary configuration of a computer system including the invention has been described above, it will be appreciated that the present invention is applicable not only a computer system having such a configuration.

As an alternative to being implemented as a separate device 38 as shown in FIG. 1, the DMAC 38 can be integrated as part of an I/O device, or part of the processor. In such implementations, the efficiencies of control already described above can still apply.

Figure 17:
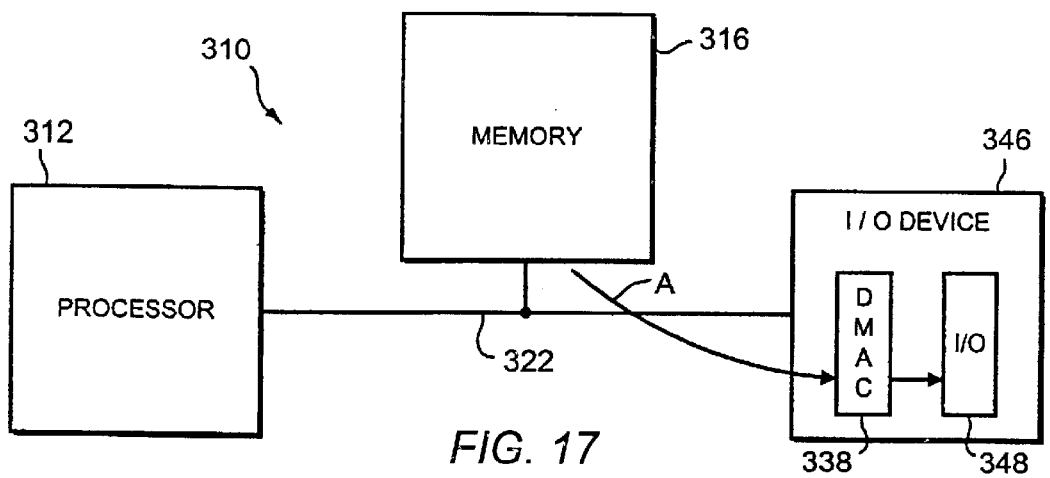
FIG. 17 is a schematic block diagram of another example configuration of a computer system incorporating the present invention.

FIG. 17 illustrates an exemplary configuration of a computer system 310, where a DMAC 338 is implemented as part of an I/O device 346. As shown in FIG. 17, a processor 312, a memory 316 and the DMAC 338 of an I/O device 346 are interconnected via a processor bus 322. The DMAC and the processor can include the configuration of pointers and control as described with reference to FIGS. 2 to 7 above. DMA operations to and from I/O elements 348 of the I/O device can be controlled by the DMAC 338. The efficiencies of control already described apply to this embodiment.

Figure 18:
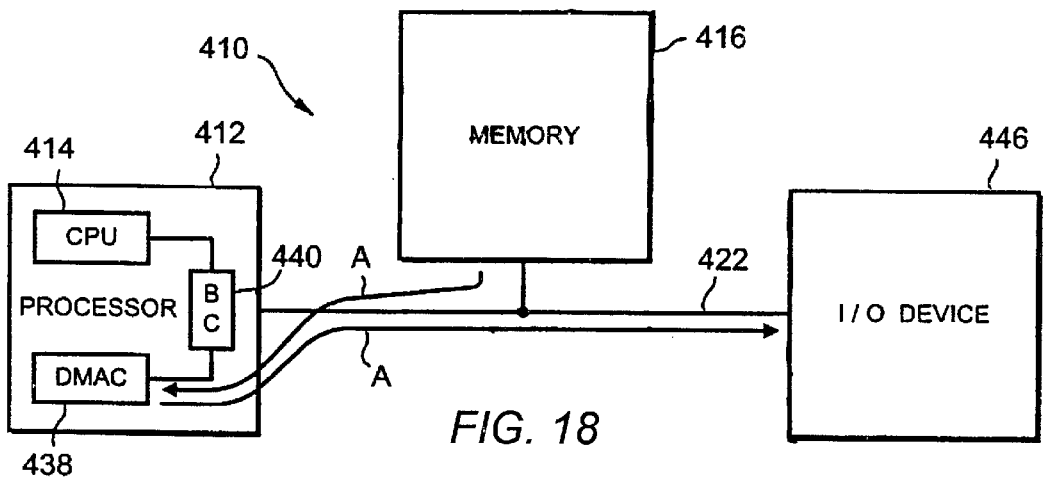
FIG. 18 is a schematic block diagram of a further example configuration of a computer system incorporating the present invention.

FIG. 18 illustrates another exemplary configuration of a computer system 410, where a DMAC 438 is implemented as part of a processor 412. A CPU 414 and the DMAC 438 are interconnected via a bus controller 440. The bus controller 440 of the processor 412, a memory 416 and one or more I/O devices 446 are interconnected via a bus 422. DMA operations. can be effected, for example, between the memory 416 and the I/O device 446.

Figure 19:
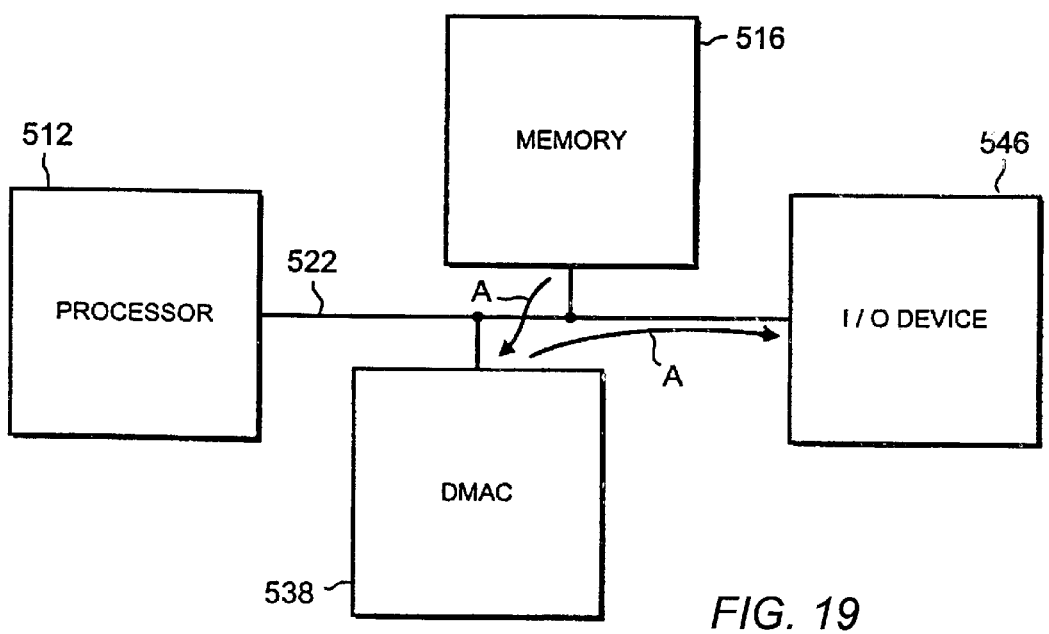
FIG. 19 is a schematic block diagram of yet another example configuration of a computer system incorporating the present invention.

FIG. 19 illustrates a further exemplary configuration of a computer system 510. In this case, a processor 512, a memory 516, a DMAC and one or more I/O devices 546 are interconnected via a bus 22. The DMAC 538 is operable to control DMA transfers between the memory of 516 and the I/O device 548.

In each of FIGS. 17–19, the arrows A illustrate operations of the DMAC×38 for reading from memory×16 to the I/O device×46.

In any implementation, the DMAC can be operable, not only for moving data between memory and the I/O device, but also from place to place in memory. Where the DMAC is implemented separate from the processor (e.g. in FIGS. 1, 17 and 19), the data will flow into the DMAC from main memory, and can then be written back by from the DMAC to main memory, without requiring a second bus port on the DMAC.

The DMAC can always be implemented as a single-port device, even if it is intended for copying data between main memory. and an I/O device. In such a case, the single port will be used for both memory and I/O transfers. As a result, it is possible in such a case that optimum use of system bandwidth may not be achieved. However, the simplicity of command buffer control described with respect to the preferred embodiment can mean that such an implementation is still attractive.

Indeed, it will be appreciated that although particular embodiments of the invention have been described, many modifications/additions and/or substitutions may be made within the spirit and scope of the present invention as defined in the appended claims.

What is claimed is:

1. A direct memory access (DMA) controller for a computer system, which computer system includes a processor and a command buffer for holding a sequence of DMA commands, wherein the DMA controller comprises control logic, a head register for holding a pointer for pointing to a head of the sequence of DMA commands in the command buffer and a tail register for holding a tail pointer pointing to a tail of the sequence of DMA commands in the command buffer, the control logic being responsive to the tail pointer in the tail register for accessing a DMA command to be transferred from the command buffer to the DMA controller.

2. The DMA controller of claim 1, wherein the command buffer is configured as a ring buffer.

3. The DMA controller of claim 1, wherein the control logic is operable to compare the head and tail pointers in the head and tail registers, respectively, and to respond to the head and tail pointers being equivalent as indicative of the sequence of DMA commands containing no DMA commands.

4. The DMA controller of claim 1, wherein the control logic is operable to compare the head and tail pointers in the head and tail registers, respectively, and to respond to non-equivalence of the head and tail pointers as indicative of at least one DMA command being in the sequence of DMA commands, and then to use the tail pointer in the tail register for accessing a DMA command to be transferred from the tail of the sequence of DMA commands in the command buffer to the DMA controller.

5. The DMA controller of claim 4, wherein the control logic is further operable to write a completion indicator to a location in the command buffer from which a DMA command has been read.

6. The DMA controller of claim 4, wherein the control logic is further operable to update the tail pointer in the tail register following completion of a DMA command from a location in the command buffer.

7. The DMA controller of claim 1, wherein the control logic is operable to control the tail pointer to provide modulo-addressing of the command buffer for configuring the command buffer as a ring buffer.

8. A computer system including a processor, a command buffer for buffering a sequence of direct memory access (DMA) commands, and a DMA controller, wherein the DMA controller comprises control logic, a head register for holding a head pointer for pointing to a head of the sequence of DMA commands in the command buffer and a tail register for holding a tail pointer for pointing to a tail of the sequence of DMA commands in the command buffer, the control logic being responsive to the tail pointer in the tail register for accessing a DMA command to be transferred from the command buffer to the DMA controller.

9. The computer system of claim 8, wherein the command buffer is configured as a ring buffer.

10. The computer system of claim 8, wherein the processor is operable to add DMA commands to the command buffer and to update the head pointer in the head register of the DMA controller.

11. The computer system of claim 8, wherein the processor is operable to add a plurality of DMA commands to the command buffer and then to update the head pointer in the head register of the DMA controller.

12. The computer system of claim 8, wherein the processor is operable to maintain a mirror head pointer in a mirror head register, the processor being responsive to the mirror head pointer for adding DMA commands to the head of the sequence of commands in the command buffer.

13. The computer system of claim 12, wherein the processor further maintains a mirror tail pointer in a mirror tail register, the processor being responsive to a predetermined relationship between the mirror head pointer and the mirror tail pointer to retrieve a current tail pointer value from the tail register in the DMA controller for updating the mirror tail pointer in the mirror tail register.

14. The computer system of claim 8, wherein the DMA controller control logic is operable to compare the head and tail pointers in the head and tail registers, respectively, and to respond to the head and tail pointers being equivalent as indicative of no DMA commands being available in the command buffer for transfer.

15. The computer system of claim 8, wherein the DMA controller control logic is operable to compare the head and tail pointers in the head and tail registers, respectively, and to respond to non-equivalence of the head and tail pointers as indicative of at least one DMA command being available in the command buffer for transfer and then to use the tail pointer in the tail register for accessing a DMA command to be transferred from the command buffer to the DMA controller.

16. The computer system of claim 15, wherein the DMA controller control logic is further operable to write a completion indicator to a location in the command buffer from which a DMA command has been read.

17. The computer system of claim 15, wherein the DMA controller control logic is further operable to update the tail pointer value following completion of a DMA command from a location in the command buffer.

18. The computer system of claim 8, wherein the pointers are controlled so as to provide modulo-addressing of the command buffer for configuring the command buffer as a ring buffer.

19. The computer system of claim 8, wherein the command buffer is configured in a memory, a processor bus connecting the processor to the memory.

20. The computer system of claim 19, wherein the DMA controller is connected to the processor bus.

21. The computer system of claim 20, wherein at least one I/O device is connected to the processor bus.

22. The computer system of claim 19, wherein at least one I/O device is connected to an I/O bus, the DMA controller being located between the processor bus and the I/O bus.

23. The computer system of claim 22, comprising a third bus between the processor bus and the DMA controller, an I/O control bridge being located between the processor bus and the third bus and the DMA controller being located between the third bus and the I/O bus.

24. The computer system of claim 8, wherein the DMA controller is integral with the processor.

25. The processor system of claim 8, wherein the DMA controller is integral with an I/O device.

26. A method of controlling direct memory access (DMA) in a computer system including a processor, a command buffer for holding a sequence of DMA commands and a DMA controller, the method comprising:

the processor adding at least one DMA command to a head of the sequence of DMA commands in the command buffer and updating a head pointer in the DMA controller;

the DMA controller transferring a DMA command from a tail of the sequence of DMA commands in the command buffer by DMA using a tail pointer held in a tail register in the DMA controller.

27. The method of claim 26, comprising configuring the command buffer as a ring buffer.

28. The method of claim 26, comprising:

the processor adding a DMA command to the head of the sequence of DMA commands in the command buffer and updating a head pointer in the DMA controller.

29. The method of claim 28, comprising:

the processor maintaining a mirror head pointer in a mirror head register, the processor being responsive to the mirror head pointer for adding a DMA command to the head of the sequence of DMA commands in the command buffer.

30. The method of claim 29, comprising:

the processor further maintaining a mirror tail pointer in a mirror tail register, the processor being responsive to a predetermined relationship between the mirror head pointer and the mirror tail pointer to retrieve a current tail pointer value from the tail register in the DMA controller for updating the mirror tail pointer in the mirror tail register.

31. The method of claim 30, comprising:

the DMA controller comparing the head pointer in the head register and the tail pointer in the tail register and responding to the head pointer and the tail pointer being equivalent as indicative of the sequence of DMA commands in the command buffer including no DMA commands.

32. The method of claim 31, comprising:

the DMA controller comparing the head pointer in the head register and the tail pointer in the tail register and responding to non-equivalence of the head pointer and the tail pointer as indicative of there being at least one DMA command in the sequence of DMA commands in the command buffer, the DMA controller then using the tail pointer to access a DMA command from the tail of the command buffer.

33. The method of claim 32, comprising:

the DMA controller updating the tail pointer after completion of a DMA command from the command buffer.

34. The method of claim 33, comprising:

the DMA controller writing a completion indication to a location in the command buffer from which a DMA command has been read.

35. The method of claim 34, comprising:

modifying the pointers so as to provide modulo-addressing of the command buffer for configuring the command buffer as a ring buffer.

* * * * *